June 9, 1953  E. R. MAURER ET AL  2,641,140
POWER TRANSMISSION AND DRIVE CONTROL THEREFOR
Filed Jan. 31, 1948  3 Sheets-Sheet 1

INVENTORS.
Edwin R. Maurer,
Joseph D. Caton.
BY
Harness & Harry
ATTORNEYS.

Patented June 9, 1953

2,641,140

UNITED STATES PATENT OFFICE 2,641,140

POWER TRANSMISSION AND DRIVE CONTROL THEREFOR

Edwin R. Maurer and Joseph D. Caton, Detroit, Mich., assignors to Chrysler Corporation, Highland Park, Mich., a corporation of Delaware Application January 31, 1948, Serial No. 5,576

20 Claims. (Cl. 74—645)

This invention relates to automotive transmissions employing slip coupling driving means for instance, fluid power transmitting devices often called "fluid drives" in combination with a change speed mechanism, and to means for improving the overall operating performance of the fluid device and the transmission. The subject application is in part a division and in part a continuation of our copending application, Serial No. 531,868 filed April 20, 1944 now Patent No. 2,466,721, granted April 12, 1949.

During recent years fluid power transmitting devices have come into wide use in motor vehicles, for example, for coupling the engine to the change speed mechanism and vehicle driving wheels.

The inherent "slip" between the input and output members of the fluid power device during operation gives flexibility to the performance of the vehicle, reduces gear shifting and provides smoothness of power transmission. This slip varies from 100% when the output member is stationary with the input member rotating, to approximately 2% when the vehicle is operating at cruising speeds under normal load.

Although the aforementioned slipping characteristic is of great advantage during low speed operation of the vehicle, it is not particularly necessary or desirable during medium and high speed operation of the vehicle when the slips are low, and in many instances may be objectionable. For example, even two percent slip normally present at cruising speeds wastes fuel, and as this slip is increased at lower speeds and when additional load is suddenly thrown on the engine by rapid acceleration, ascending hills etc., considerable waste of fuel may occur, especially in hilly country. Moreover, where the transmission includes a change speed mechanism having a power shifted synchro clutch engageable upon torque relief at predetermined vehicle speed the presence of slip in the fluid drive may increase the time of engagement of the clutch. In addition it is often desirable to obtain greater acceleration in order to pass another car. This is usually obtained in vehicles having transmissions of the type disclosed herein, by a kickdown operation of the accelerator pedal to wide open throttle position. It is desired to speed up the vehicle with minimum increase in engine speed. If the fluid device is slipping at this time a higher engine speed is required to compensate for the slip and for a given car speed less than full engine output is obtained and there is waste of fuel.

Our invention is well adapted for use in connection with transmissions employing fluid couplings, and hence, for purposes of disclosure I shall describe an illustrated embodiment as so employed, it being understood, however, that this is but one of various possible applications, since as will become self-evident hereinafter the invention may also be utilized in connection with transmissions employing other conventional types of fluid power transmitting devices.

The principal object of the present invention is to provide a simple, easily manufactured, foolproof, and completely automatic device for use in connection with slip coupling power transmitting devices of automatic transmissions which functions to eliminate the slip when the latter is undesirable while permitting the device to slip when such is desirable.

Another object of our invention is to provide means for reducing the time for synchronizing a pair of interengageable clutching elements for engagement in a transmission wherein one of the elements is drivingly connected to the output member of a slip coupling power transmitting device.

Another object is to provide a simple clutching mechanism for the input and output members of a fluid power transmitting device, preferably wholly within the device and which is adapted to automatically lock the input and output members together in a one directional drive at predetermined speed of the input member.

A further object of our invention is to provide in an automotive vehicle drive system having a fluid power transmitting device and a change speed mechanism operable between a relatively slow and a relatively fast speed ratio drive, means operable for locking up the input and output members of the fluid power transmitting device just prior to effecting fast speed drive establishment in the change speed mechanism and under control of the same driver operable control means controlling said upshift.

Still another object is the provision of a vehicle drive system as in the previous object wherein the said speed change mechanism and lockup means may be substantially simultaneously conditioned for operation and speed change and lockup effected by a single operation of the vehicle driver.

An additional object is to provide in an automotive drive system having a fluid power transmitting device and a change speed mechanism automatically shiftable between a relatively slow and a relatively fast speed ratio drive, centrifugal clutch means engageable for locking up the input and output members of the fluid device, which means will remain engaged upon downshifting of the change speed mechanism to obtain greater acceleration at a vehicle speed at which such mechanism would normally be operating in its high speed ratio drive.

Another advantage in the invention resides in the fact that elimination of slip at vehicle cruising speeds will permit great flexibility in the design and construction of fluid couplings, because formerly emphasis was placed on the attainment of maximum efficiency at cruising speeds to the exclusion of other desirable operating characteristics. By means of our invention the coupling may be designed with a relatively high stall speed such that slip at engine idling speed may be actually increased and thus tendency for the vehicle to creep at idling speed is eliminated.

Other objects and advantages will be apparent to those skilled in the art from a reading of the following description, taken in connection with the accompanying drawings.

Figure 1:
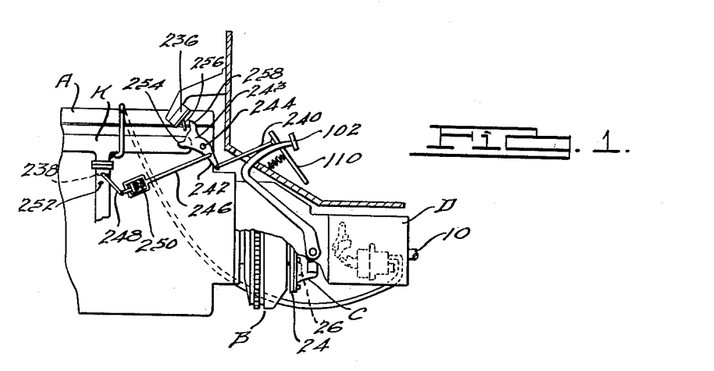
Fig. 1 is a side elevational view showing a motor vehicle engine and power transmission system provided with our invention.
Figures 3, 4:
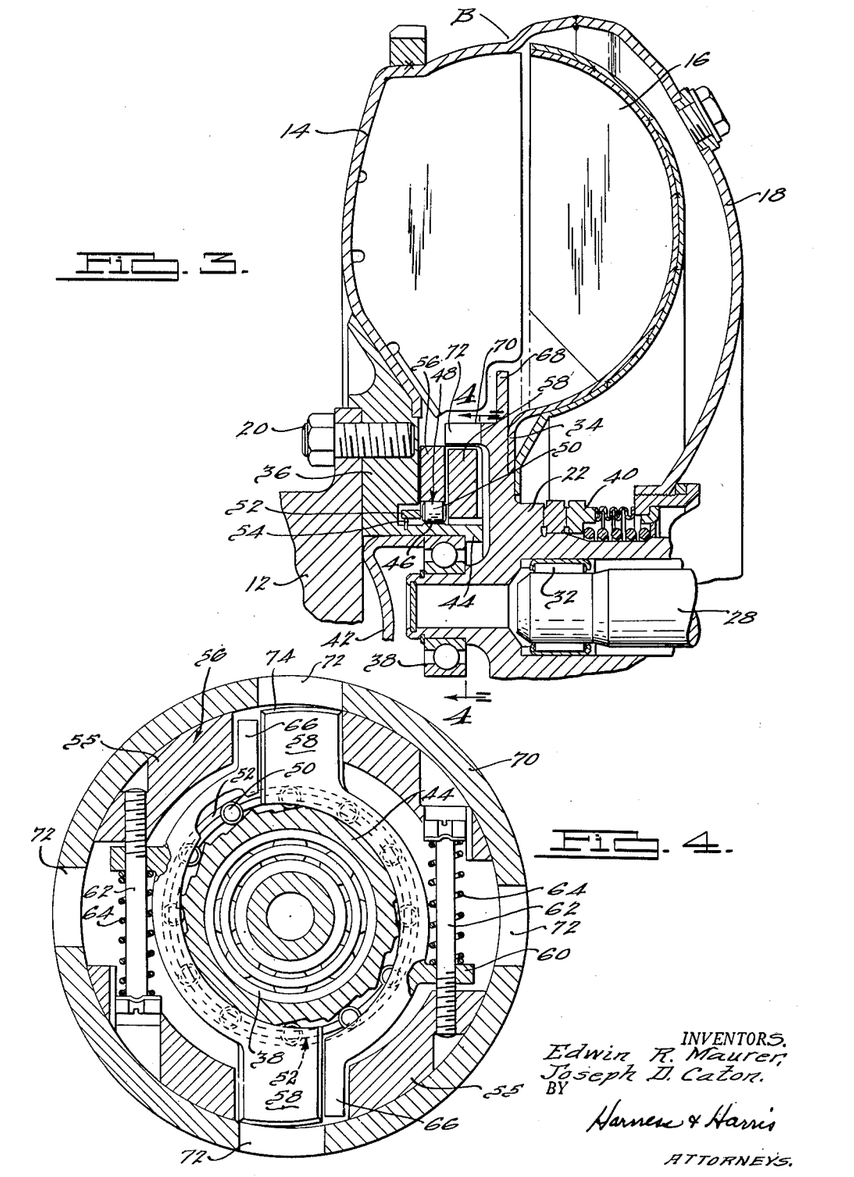
Fig. 3 is a longitudinal vertical section of the upper portion of a fluid coupling employed in the Fig. 1 drive system and embodying the slip eliminator feature of our invention.
Fig. 4 is a section along the line 4—4 of Fig. 3.

In the drawings A represents the internal combustion engine which drives through a fluid power transmitting device B shown in Fig. 3 to be a fluid coupling, and through a conventional type of friction main clutch C to the change speed mechanism D whence the drive passes from output shaft 10 to drive the rear vehicle wheels in the usual manner.

The engine crankshaft 12 carries the vaned fluid coupling impeller 14 which in the well known manner drives the vaned runner 16. The impeller has a housing portion 18 for enclosing the runner 16 and is fastened by studs 20 to the crankshaft 12 in the usual practice. The drive passes from the runner 16 through the runner hub 22 to main clutch driving member 24. This member then transmits the drive, when main clutch C is engaged through driven member 26 to the change speed mechanism driving shaft 28 carrying the main drive pinion 30.

The change speed mechanism drive shaft 28 is piloted by means of an anti-friction bearing 32 in the runner hub 22 to which the runner is welded as at 34. The hub 22, is in turn, piloted in the impeller hub 36, an anti-friction bearing 38 being disposed between the members.

The usual seal 40 is provided between the housing 18 and the runner hub 22 to prevent the escape of the coupling fluid. A front seal 42 prevents leakage at the forward portion of the assembly.

The impeller hub 36 has a rearwardly projecting annular portion 44 on which is formed at 46 a series of cams. These cams form one element of a roller clutch 48 having rollers 50 held in place by a cage 52; a wrap type of spring 54 being provided to energize the clutch.

The other element of the clutch 48 is formed by a pawl drive plate 56 which has an inner cylindrical surface in engagement with the rollers 50 and carries a pair of centrifugally actuated pawls 58. The pawls are an element of a centrifugal clutch and have ears 60 for loosely engaging bolts 62 (see Fig. 4). The bolts 62 are rigidly carried in rearwardly extending portions 55 of the pawl drive plate 56 as shown and mount a coiled compression spring 64 which tends to keep the pawls 58 in retracted position. The pawls are shaped as illustrated and each has an integral tail portion 66 which lies alongside the engaging or head portion of the other pawl and acts as a driving connection between the pawl and the plate 56 as well as a guide to keep the pawls in position. The pawls loosely embrace the hub portion 44 and have sufficient clearance with respect thereto such that they can move radially outwardly under the influence of centrifugal force. This movement is limited in both directions by engagement of the inner surface of the pawls with the hub portion 23 as will be understood.

The springs 64 may be of any desired strength to produce the operating characteristics desired, it being understood that the springs will keep the pawls in the illustrated retracted position until a predetermined speed of the shaft 12 is reached whereupon the centrifugal force will overcome the force of the springs and the pawls will tend to move radially outwardly as will be explained below.

The runner hub 22 has the well known baffle 68 for reducing the efficiency of the coupling at idling speed and for preventing surges and is also formed with a forwardly projecting annular member or portion 70 provided with circumferentially spaced notches 72. Four notches are shown, but more may be required in some installation, just as more than two pawls may be required for smooth operation.

The notches 72 are radially aligned with the pawls 58 such that the pawls may engage the notches to lock the drive plate 56 to the runner hub 22. The pawls 58 are formed with an outer cammed surface 74 which is shaped such that when the pawls are urged outwardly by centrifugal force and the member 70 is rotating at a different speed than the plate 56, the surfaces 74 will engage the edge of the notches 72 and cam the pawls inwardly until the speeds of the two members are substantially equal whereupon the pawls will enter the notches.

Let it be assumed that the strength of springs 64 is such that the pawls will be maintained in retracted position up to about 800 R. P. M. of the impeller 14, this corresponding roughly to a 20 M. P. H. speed of the vehicle in direct drive.

The vehicle will then be driven through the coupling with the usual slip between the impeller 14 and the runner 16, and the pawl drive plate 56 and pawls 58 will be driven at engine speed through lock up of the overrunning clutch 48. After the engine speed reaches a value above 800 R. P. M. the force of springs 64 will be overcome and the pawls 58 will be urged outwardly but will be prevented from moving into engagement with the slots 72 because of the difference in speeds between the plate 56 and annular portion 70, the plate 56 overrunning the portion 70 because of the lag of the runner 16.

When the driver has reached a satisfactory car speed above 20 M. P. H. he releases the throttle control momentarily which causes a drop in speed of the impeller 14 and pawl drive plate 56. The latter will then rapidly reach the speed of the runner 16 and member 70 and at the instant of synchronization the pawls will move out into the notches 72. The impeller 14 and runner 16 will then be directly connected and acceleration of the vehicle will cause it to operate without slip.

The pawls 58 once engaged will remain engaged at all speeds above 800 R. P. M. of shaft 12 and down to a slightly lower speed because of the friction between the pawls and the sides of the notches 72. At some speed below the engaging speed, the springs 64 will pull the pawls out of the notches and the vehicle will again be in slip drive. If the throttle is released so as to cause the vehicle to coast, below the pawl cut-in speed, the pawls will drop out sooner because there is less force tending to hold them in the notches due to the fact that the pawl drive plate 56 is freewheeling with respect to the impeller 14.

It will thus be seen that while the coupling is locked up and slip is eliminated when the engine is driving the vehicle, when the vehicle is driving the engine slip is present because of the overrunning clutch 48 which permits the pawl assembly to overrun the hub 36.

The overrunning roller clutch 48 has another and more important function in that it prevents possible damage to the pawls 58 and notches 72 when the car is coasting with a dead engine and when it is being towed or pushed. In such instances, if the roller clutch was omitted and the pawl plate 56 driven directly from the hub 36, there would be an outward movement of the pawls when the speed of the impeller reached the pawl cut-in speed (the impeller being driven by the runner with the runner turning faster than the impeller) and damage might result because the cammed ends 74 are formed to cam the pawls inwardly when they tend to engage with the impeller turning faster than the runner, but not vice versa. This is an important safety feature and renders the device foolproof.

The present invention is particularly adapted for use with transmissions or change speed mechanisms of the semi-automatic stepup type such as those described in the patent to Syrovy et al. 2,277,799 granted March 31, 1942; Dunn et al. Patent No. 2,159,429, granted May 23, 1939; and a Maurer Patent No. 2,154,575, granted April 18, 1939. Thus the Syrovy et al. patent discloses as in Fig. 2 of the present application, a transmission or change speed mechanism wherein a drive pinion 30 is in constant mesh with a gear 76 which drives the countershaft 78 through an overrunning clutch "E" of the usual type such that when the shaft 28 drives in its usual clockwise direction (looking from front to rear) then the overrunning clutch will engage to lock the gear 76 to the countershaft 78 whenever the gear 76 tends to drive faster than the countershaft. However, whenever the gear 76 tends to rotate slower than the countershaft 78 then the said overrunning clutch will automatically release whereby the shaft 28, under certain conditions, may readily drop its speed while the countershaft 78 continues to revolve.

Countershaft 78 comprises cluster gears 80, 82 and 84 which respectively provide drives in first, third, and reverse speed ratio. Freely rotatable on the driven shaft 10 of the change speed mechanism are the first and third driven gears 86, 88 respectively in constant mesh with countershaft gears 80, 82. A hub not shown, is splined on the shaft 10 and carries therewith a manually shiftable sleeve 90 adapted to shift from the Fig. 2 neutral position either rearwardly to clutch with teeth 92 of the gear 86 or else forwardly to clutch with the teeth 94 of the gear 88. The sleeve 90 is operably connected to the shift rail 96 adapted for operation by any suitable means under shifting control of the vehicle driver.

Figure 2:
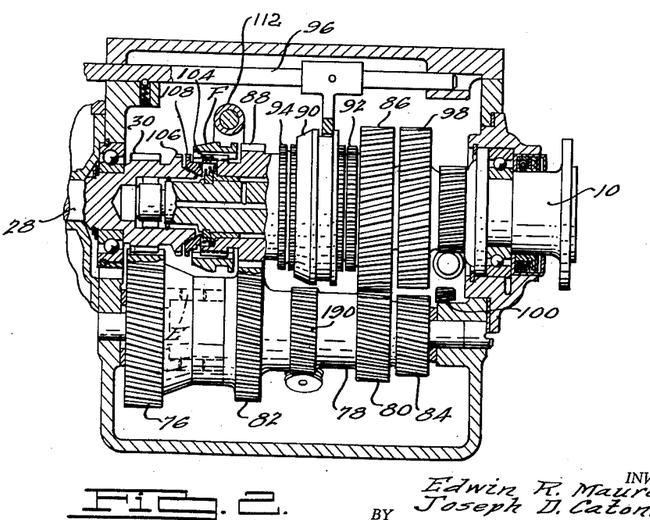
Fig. 2 is a longitudinal sectional elevational view through the change speed mechanism.

The shaft 10 also carries splined thereon reverse driven gear 98. A reverse idler gear 100 is suitably mounted so that when reverse drive is desired the idler 100 is shifted into mesh with the gears 84 and 98.

First, third, and reverse speed ratio drives and neutral are under manual control of the vehicle driver when starting the vehicle from rest, the main clutch C being released by depressing the pedal 102 in shifting into any one of these drives.

First speed ratio drive is obtained by shifting the sleeve 90 rearwardly to clutch with the teeth 92, the drive passing from the engine A through the fluid coupling B, clutch C, and shaft 28 to the pinion 30, thence through the gears 76, 80, 86, sleeve 90 to the shaft 10.

Third speed ratio drive is obtained by shifting the sleeve 90 forwardly to clutch with the teeth 94, the drive passing from the engine to the gear 76 as before, thence through the gears 82, 88 sleeve 90 to the shaft 10.

Slidably splined on the teeth 104 carried by the gear 88 is an automatic clutching sleeve F which under certain conditions, is adapted to shift forwardly to clutch with teeth 106 carried by the pinion 30 thereby positively clutching the shaft 28 directly to the gear 88. This sleeve F is adapted to step up the speed ratio drive from first to second and from third to fourth which latter is a direct drive speed ratio. Control means in the nature of a tooth blocker ring 108 is provided which limits clutching of the sleeve F to approximate synchronism with the teeth and also to a condition of engine coast, sleeve F being prevented from clutching during that condition known as engine drive as when the engine is being speeded up under power.

When driving in first, second is obtained by the driver releasing the usual accelerator pedal 110 thereby closing the engine throttle valve and allowing the engine to rapidly coast down or decelerate. When this occurs, the engine along with the shaft 28, pinion 30, and gear 76 all slow down while the shaft 10 along with the gears 86 and 80 continue their speeds by accommodation of an overrunning clutch E located between the gear 76 and the countershaft 78, which now overruns. The engine slows down until the teeth 106 are brought to approximate synchronism with the sleeve F which thereupon automatically shifts to clutch with teeth 106 resulting in a two-way drive for second speed ratio drive as follows: pinion 30 through sleeve F to gear 88 thence through gears 82, 80, 86 to sleeve 90 and shaft 10, the freewheel clutch E overrunning.

When driving the vehicle in third speed ratio drive, fourth or direct drive is obtained just as for second by driver release of the accelerator pedal and resulting shift of the sleeve F to clutch with the teeth 106 when these parts are synchronized by reason of the engine coasting down from the drive established in third speed ratio drive. The direct drive is a two-way drive as follows: pinion 30 through sleeve F to gear 88 to sleeve 90 to shaft 10, the clutch E overrunning as before.

Figure 5:
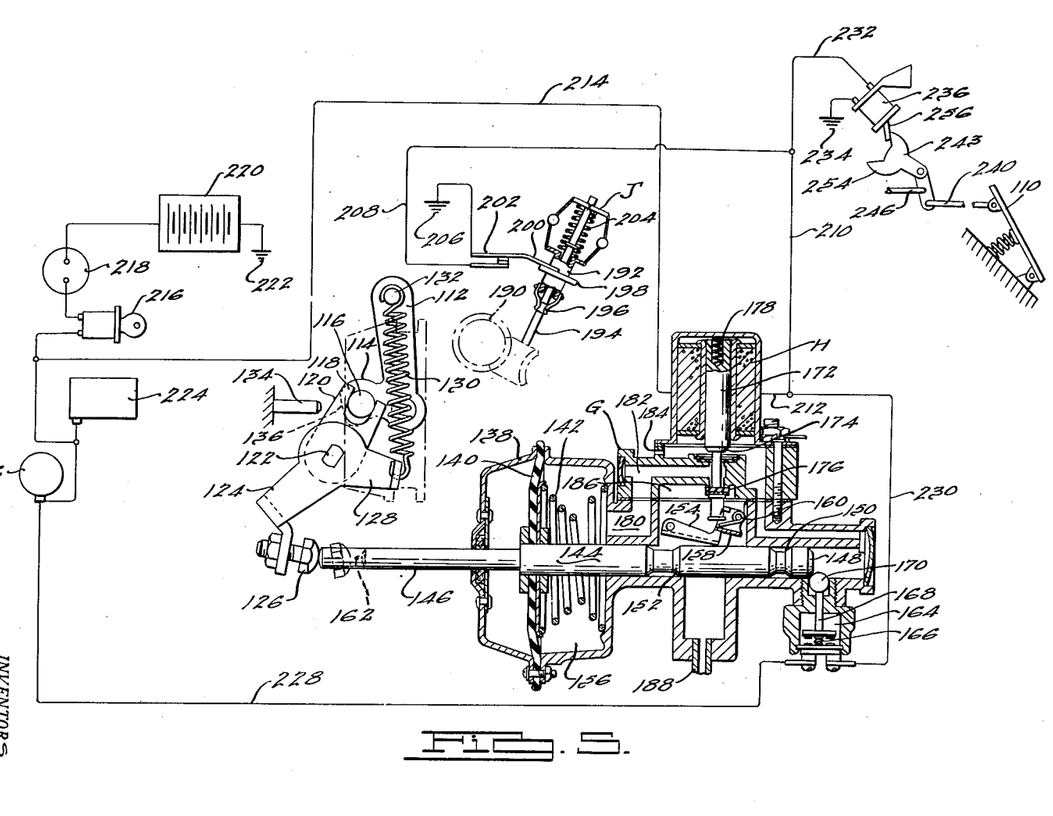
Fig. 5 is a diagrammatic view of the control mechanism for the slip eliminator of Fig. 3 and the automatic clutching sleeve of Fig. 2, the latter being shown in its disengaged position.

The change speed mechanism is provided with suitable power operable motor means for controlling shift of the sleeve F along with several other control means. Referring to Figs. 1 and 5 there is illustrated a pressure fluid operated motor G using, for example, air pressure for its operation. For convenience this motor is arranged to operate by the vacuum in the intake manifold system of the engine under control of an electromagnetic means comprising a solenoid H.

The sleeve F is provided with a shift groove engaged by the depending arms of a yoke 112 which has its ends rotatably supported in the housing of the change speed mechanism D. One arm of the yoke 112 has a forward lever extension 114 carrying a pin 116 which is engaged by the forked end portion 118 of a lever 120 fixed to the inner end of a rockshaft 122. This rockshaft has an outer end extending outside the change speed casing where it carries a depending lever 124 which is fixed to the rockshaft 122. Lever 124 constitutes what may be termed a "follower member" and carries an adjustable set screw 126 forming an operating abutment portion of the lever. This lever 124 has another lever arm 128 extending rearwardly therefrom and is engaged by one end of a tension coil spring 130. The upper end of this spring is anchored to the cantilever end of a pin 132 which is seated in one of the casing journals, not shown, for rotatably supporting the rockshaft on pin 132.

Forward clutching shift of the sleeve F is effected under control of the motor G, by the spring 130 exerting a pull on the lever 128 in a counter-clockwise direction, as viewed in Fig. 5. This rotary motion of the lever 128 is transferred through the rockshaft 122 and lever 120 to the pin 116 thereby thrusting the sleeve F forwardly. Forward shift of the sleeve F is suitably limited as by the stop pin 134 which is fixed to the casing and projects therefrom for engagement by the forward flat face 136 of the yoke extension 114 when the sleeve F is fully clutched with the teeth 106.

Motor G comprises a casing 138 containing the diaphragm 140 urged in a direction to release the sleeve F by a spring 142 which is much stronger than the action of the spring 130 so that when spring 142 expands, its force will readily stretch the spring 130. Diaphragm 140 is connected to a lever member in the form of a rod 144 which has a forward extension 146 aligned with the abutment portion 126 of the lever 124.

Rod 144 has a series of detents 148, 150 and 152, the latter cooperating with a pivoting latch 154 such that the vacuum is admitted to the chamber 156 to cause the diaphragm 140 and rod 144 to move rearwardly, the latch 154 under action of the pivoted latch operating part 158 and rat trap spring 160 catches on the rear shoulder of detent 152 and holds the rod 144 in its pivoted position. At this time the rod portion 146 moves further than the lever 124 by the amount of gap 162 shown by the phantom positioning of the rod 146 and abutment 126 in Fig. 5, the stop pin 134 limiting forward movement of the sleeve F by the spring 130, the latter becoming operable when the rod 144 is shifted rearwardly as thus described.

In order to provide for release of the sleeve F, it is desirable to provide some means for momentarily relieving the torque load at the teeth 106 and sleeve F and in the present instance we have provided such means as a system of ignition interruption by grounding the primary wire of the usual distributor of the ignition system whereby the engine ignition may be momentarily rendered ineffective thereby unloading the torque at sleeve F sufficiently to insure its release by the spring 142. This ignition interrupting system is under control of an interrupter switch 164 which is closed against the action of a switch opening spring 166 by a plunger 168 and ball 170 whenever the rod 144 moves rearwardly as described above when effecting engagement of the sleeve F, by reason of the enlarged rod portion between the detents 148 and 150. The detent 150 is so arranged that with the parts in such position that the sleeve F is clutched, the rod 144 may move forwardly sufficiently to close the gap 162 at the lost motion between the rod portion 146 and lever 124, this movement causing the switch 164 to close and ground the ignition system whereupon spring 142 may then cause further movement of rod 144 to release sleeve F, the switch 164 then opening by detent 148 to restore the ignition system.

The vacuum supply to chamber 156 is under control of the solenoid H which comprises an armature plunger 172 having valving parts 174, 176. In Fig. 5 the solenoid H is energized thereby raising the plunger 172, the spring 178 to seat the valve 176 and shut off the vacuum supply to the chamber 156 and at the same time unseat the valve 174 so as to vent this chamber through the passage 180, chamber 182, and vent passage 184. When the solenoid is deenergized then the spring 178 lowers the plunger 172 thereby seating the valve 174 to shut off the vent 184 and open valve 176, thereby opening the chamber 156 to the engine intake manifold K, Fig. 1, through passage 180, chamber 186, and pipe 188.

Speed responsive means is provided for controlling the energization of the solenoid H so as to insure automatic release of the sleeve F below a predetermined car speed and automatic engagement of the sleeve F above a predetermined car speed. Whenever the car is in forward driving condition the manual sleeve 90 is either shifted rearwardly to the low range position or forwardly to the high range position so that by driving a governor from the countershaft 78 it is possible to provide a speed control operated proportionate to the speed of travel of the vehicle. Driven from the countershaft gear 190 is a governor J of any suitable type, this governor operating a sleeve 192 outwardly along its drive shaft 194 as the car speed reaches a predetermined point, the breakaway being under control of a detent 196 if desired.

The sleeve 192 has a shoulder 198 engaged by the swinging switch piece 200 of the governor switch 202. When the car is stationary the detent 196 is engaged and the switch 202 is closed. As the car accelerates, the governor eventually reaches its critical speed and detent 196 releases thereby causing the switch 202 to open. As the car slows down, the governor spring 204 restores the parts to the Fig. 5 position and by proportioning the various parts, it is obvious that switch 202 may be made to function at desired speeds proportionate to car travel. As an example of one arrangement of governor operation and gearing operation, the governor may be made to open switch 202 during car acceleration in first and third respectively at approximately 7 and 15 M. P. H., the switch 202 closing on stopping the car in second and direct at approximately 3 and 7 M. P. H. respectively.

The governor solenoid circuit under control of the switch 202 comprises ground 206 to switch 202 thence through conductors 208, 210, 212 to solenoid H thence to conductor 214 to ignition switch 216, ammeter 218, battery 220, and ground 222.

In Fig. 5 is illustrated a portion of the engine ignition circuit which extends from the battery 220 and ammeter 218 to ignition switch 216 thence to coil 224 and distributor 226.

The ignition grounding circuit for rendering the ignition momentarily inoperative comprises a grounding conductor 228 extending from the distributor 226 to ignition interrupter switch 164 thence by conductor 230 to conductor 232 extending to ground 234 under control of a switch 236 called a kickdown switch because it is controlled by the accelerator pedal 110 when fully depressed to effect stepdown in the change speed mechanism speed ratio drive by disengagement of the sleeve F.

The kickdown solenoid circuit extends from the ground 234 through the switch 236 and conductors 232, 210, 212 through solenoid H and conductor 214 and thence through ignition switch 216 to ground 222 just as for the governor solenoid circuit.

The kickdown switch 236 is preferably closed when the engine throttle valve 238, Fig. 1, is fully open. This may be accomplished by arranging the accelerator pedal 110 for a movement overtraveling in wide open throttle position. Pedal 110 operates a link 240 so as to swing bellcrank lever 242, 243 about its pivot 244. Lever arm 242 operates link 246 which is connected to the throttle valve lever 248 through a lost motion spring 250. Ordinarily, this spring affords a solid connection between the link 246 and lever 248 but when pedal 110 is depressed to cause the lever 248 to engage the stop 252 at wide open throttle, then further depression of the pedal 110 will cause finger 254 of lever arm 243 to throw arm 256 of switch 236 upwardly thereby closing switch 236, the spring 250 yielding to accommodate this overtraveling movement of the accelerator pedal. When the pedal is released, then finger 258 restores switch 236 to open the kickdown solenoid circuit.

In driving a vehicle equipped with one of the above described transmissions, the driver accelerates the car in a low speed gear ratio, for example, second speed ratio to a speed above the engagement speed of the sleeve F, then releases the throttle momentarily whereupon the clutch sleeve F engages to establish fourth speed ratio (direct drive) during a short freewheeling period.

Such a transmission is employed in conjunction with the present invention, the cut-in speed of the pawls 58 can be made to coincide with the speed of engagement of the clutch sleeve F so that simultaneous operation of the two clutch means may be obtained during one short period of throttle release. This is a distinct advantage inasmuch as it is desirable to have the fluid power transmitting device locked up whenever it is possible to drive the vehicle with the transmission in direct drive. The combination provides an extremely pleasing operation and "feel" of the vehicle without entailing any additional effort or thought on the driver's part.

A further feature obtained by this combination of clutches and control is that it becomes possible to cut down the time of engagement of the sleeve F, this being a distinct advantage during driving. When the accelerator pedal is released momentarily to obtain engagement of the pawls 58 and the sleeve F the engine will slow down so as to permit the pawls 58 to synchronize with the shell portions 70 of the clutch, the engine decelerating faster than the portion of the mechanism between the runner hub 22 and countershaft gear 76 so that the pawls 58 will become engaged before the clutch F becomes synchronized. With a solid connection thus obtained between the engine and the drive pinion 30 the engine will immediately impose its decelerating influence on the pinion 30 which as above stated, carries the clutch element 106 to thus synchronize the clutch element 106 with the sleeve F so that direct drive may then be obtained. In some cases it may be desirable that the pawls 58 be conditioned to become engaged at a slightly lower vehicle speed than that at which the clutch F will engage to thus assure a solid connection between the engine and the clutching element 106 at the time that the clutch F is to be engaged. It will be observed in this connection that if there were no clutch between the impeller and runner it would be necessary in order to obtain engagement of the clutch F to wait until the engine drops to a lower speed than is necessary when the lockup clutch is present. This is because there is slip between the input and output members of the fluid device at the time that the shift is being made and the output member is rotating at a lower speed than the impeller. By locking up the fluid device it is merely necessary to synchronize the sleeve F with the engine speed.

A further advantage of the clutch mechanism for the fluid device is that it is possible to have the same continue in lockup condition during kickdown operation of the transmission. As described above, by depressing the accelerator pedal 110 to wide open throttle position the kickdown switch 236 is operated to momentarily ground the ignition and energize the solenoid H to vent the cylinder 156 and disengage the sleeve F to thereby downshift the transmission to a lower speed ratio drive. During this operation the pawls 58 do not disengage even though the clutch F does. This is because the operation takes place at wide open throttle at which time the engine has been speeded up and manifestly also the impeller and the effect of ignition interruption is therefore merely to remove the load on the teeth of the clutch sleeve F, since the pawl-carrying member is at that time at a vehicle speed considerably above the engaging speed of the pawls 58. It is advantageous to have the centrifugal clutch locked up during the kickdown operation as the operator is then attempting to obtain greater car speed. This requires a higher engine speed. By keeping the centrifugal clutch locked up, a somewhat lower engine speed becomes possible since the coupling if allowed to slip will require a higher engine speed for the same car speed obtained by the kickdown operation with the coupling locked up. Moreover, if the coupling slips, some of the engine power will be lost.

At low vehicle speeds where slip is advantageous the centrifugal clutch will preferably be below the engaging speed of its pawls and they will then be disengaged.

Having thus described a physical embodiment of the invention for purposes of illustration, it is to be understood that such is by way of example only and it is not intended to limit the invention in its broader aspects except as set forth in the claims appended below. Manifestly other advantages and modifications falling within the purview of the subject invention will suggest themselves to those skilled in the art by reason of the foregoing description.

We claim:

1. In a motor vehicle driving system having an engine provided with a throttle valve, in combination therewith; a fluid power transmitting device having an input member and an output member; a change speed mechanism having a low speed ratio drive means and a high speed ratio drive means; and a driver operable control member for manipulating said throttle valve; said device and high speed drive means each including clutch means engageable in response to operation of said control member when the vehicle is above a predetermined speed for effecting a direct connection between said input and output members and effecting establishment of said change speed mechanism in high speed ratio drive in the order named.

2. In a motor vehicle driving system having an engine provided with a throttle valve, in combination therewith; a fluid power transmitting device having an input member and an output member; a change speed mechanism having a low speed ratio drive means and a high speed ratio drive means; a driver operable control member for manipulating said throttle valve; and positive clutch means in each said device and high speed drive means both engageable in response to operation of said control member when the vehicle is at or above a predetermined speed at which both said clutch means are engageable for effecting a mechanical connection between said input and output members, and effecting establishment of said change speed mechanism in high speed ratio drive in the order named.

3. In a motor vehicle driving system having an engine provided with a throttle valve, in combination therewith; a fluid power transmitting device having an input member and an output member; a change speed mechanism having a low speed ratio drive means and a high speed ratio drive means; a driver operable control member for manipulating said throttle valve; and locking means in each of said device and high speed ratio drive means operable in response to operation of said control member when the vehicle is above a predetermined speed for effecting a substantially 1:1 connection between said input and output members, and effecting establishment of said change speed mechanism in high speed ratio drive in the order named.

4. In a motor vehicle driving system having an engine provided with a throttle valve, in combination therewith; a fluid power transmitting device having an input member and an output member; a change speed mechanism having a low speed ratio drive means and a high speed ratio drive means, a speed responsive clutch means for mechanically connecting said input and output member; a second speed responsive clutch means in said high speed ratio drive means for establishing said mechanism in high speed ratio drive and driver operable control means for said valve operable in a valve closing direction at or above the engaging speed of both said clutch means for conditioning said system for substantially simultaneously effecting engagement of each of said clutch means.

5. In a motor vehicle driving system having an engine provided with a throttle valve and an accelerator pedal operably connected to said valve for adjustment thereof by the vehicle driver between open and closed position, in combination therewith; a fluid power transmitting device having an input member and an output member; a change speed mechanism having a low speed ratio driving means and a high speed ratio driving means; interengageable means in said device automatically engageable at or above a predetermined speed of the vehicle and in response to movement of said accelerator pedal to close said throttle valve for effecting a positive drive between said input and output members and other interengageable means in said high speed ratio driving means automatically engageable during and in response to the same accelerator movement when the vehicle is at or above said predetermined speed for effecting establishment of vehicle drive through said high speed ratio driving means.

6. In a motor vehicle driving system having an engine provided with a throttle valve and an accelerator pedal operably connected to said valve for adjustment thereof by the vehicle driver between open and closed position, in combination therewith; a fluid power transmitting device having an input member drivingly connected to said engine and having an output member; a change speed mechanism drivingly connected to said output member; a first positive clutch means in said mechanism for effecting shift from a lower to a higher speed ratio drive in the said mechanism, a second positive clutch means in said device for positively connecting said input and output members; and means including said accelerator pedal for controlling engagement of both said clutches at or above a predetermined vehicle speed, said clutch and control means being arranged and constructed to effect engagement of said second clutch and then said first clutch in response to a single operative movement of said accelerator pedal when the vehicle is at or above said predetermined speed.

7. In a motor vehicle driving system including an engine provided with a driver manipulated throttle movable between open and closed position, in combination therewith; a fluid power transmitting device having an input member drivingly connected to said engine and having an output member; change speed means drivingly connected to said output member and having a relatively low slow speed driving means and a relatively high speed driving means; positively interengageable clutch means in said high speed driving means for establishing high speed drive while driving said vehicle through said slow speed driving means; positively interengageable clutch means in said device engageable for positively drivingly connecting said input and output members; each of said clutch means being engageable at or above a predetermined vehicle speed in response to momentary closing movement of said throttle; and means including said throttle for controlling engagement of said clutches, said means being arranged and constructed to effect engagement of said clutches in the inverse order named above in response to a single operative movement of said throttle when the vehicle is at or above the engaging speeds of both of said clutches.

8. In a motor vehicle driving system having an engine provided with a throttle valve and an accelerator pedal operably connected to said valve for adjustment thereof by the vehicle driver between open and closed position, in combination therewith; a fluid power transmitting device having an input member drivingly connected to said engine and having an output member; a change speed mechanism drivingly connected to said output member; positively interengageable clutch means in said mechanism for effecting upshift in said change speed mechanism from a lower to a higher speed ratio drive; centrifugal pawl clutch means for drivingly connecting said input and output members in a unitary drive; and means including said accelerator pedal for controlling engagement of both said clutch means at or above a predetermined speed of the vehicle at which both said clutch means are engageable and in response to a single operative movement of said accelerator pedal.

9. In a motor vehicle driving system having an engine provided with a throttle valve and an accelerator pedal operably connected to said valve for adjustment thereof by the vehicle driver between open and closed position, in combination therewith; a fluid power transmitting device having an input member drivingly connected to said engine and having an output member; a change speed mechanism drivingly connected to said output member; positively interengageable clutch means in said mechanism for effecting upshift in said change speed mechanism from a lower to a higher speed ratio drive; centrifugal pawl clutch means for drivingly connecting said input and output members in a unitary drive; and means including said accelerator pedal for controlling engagement of both said clutch means in the inverse order named above at or above the same predetermined speed of the vehicle at which both said clutch means are engageable, in response to a single operative movement of said accelerator pedal.

10. In a motor vehicle driving system having an engine provided with an ignition system, a throttle valve and an accelerator pedal operably connected to said valve for adjustment thereof by the vehicle driver between open and closed position, in combination therewith; a fluid power transmitting device having an input member drivingly connected to said engine and having an output member; a change speed mechanism drivingly connected to said output member; positively interengageable clutch means in said mechanism engageable for effecting upshift in said change speed mechanism from a lower to a higher speed ratio drive; centrifugal pawl clutch means for positively connecting said input and output members in drive; both said clutch means being subjected to thrust transmission during said relatively fast speed drive so as to resist disengagement until said thrust is relieved; control means for controlling engagement of said clutches at or above a predetermined speed; means for effecting disengagement of said interengageable clutch means to step down said change speed mechanism from said higher speed ratio drive to said lower speed ratio drive and means operable in response to driver operation of said accelerator pedal while said interengageable clutch means is engaged and both said clutch means are above their disengaging speeds for effecting operation of said disengaging means and for momentarily interrupting the power delivery of said engine to relieve the thrust transmission on said interengageable means thereby to step down said change speed means to said lower speed ratio drive while providing for continued engagement of said centrifugal clutch means.

11. In a motor vehicle driving system having an engine provided with an ignition system, a throttle valve and an accelerator pedal operably connected to said valve for adjustment thereof by the vehicle driver between open and closed position, in combination therewith; a fluid power transmitting device having an input member drivingly connected to said engine and having an output member; a change speed mechanism drivingly connected to said output member; positively interengageable clutch means in said mechanism engageable for effecting upshift in said change speed mechanism from a lower to a higher speed ratio drive; centrifugal pawl clutch means in said device for positively connecting said input and output members in drive; both said clutch means being subjected to thrust transmission during said relatively fast speed drive so as to resist disengagement until said thrust is relieved, control means for controlling engagement of said clutches at or above a predetermined speed; means for effecting disengagement of said interengageable clutch means to step down said change speed mechanism from said higher speed ratio drive to said lower speed ratio drive and means operable in response to driver operation of said accelerator pedal while said positively interengageable means is engaged and is above its disengaging speed for effecting operation of said disengaging means and for momentarily interrupting said ignition circuit to relieve the thrust transmission on said interengageable means thereby to step down said change speed means to said lower speed ratio drive while providing for continued engagement of said centrifugal clutch means.

12. In a motor vehicle driving system having an engine and a driver operable engine throttle control, in combination therewith; a fluid power transmitting device having an input member drivingly connected to said engine and having an output member; a change speed mechanism having a relatively slow speed driving means and a relatively fast speed driving means, said latter means including positively engageable drive control elements operably associated therewith and adapted when engaged to establish drive of said mechanism by said fast speed driving means; a centrifugally operable clutch having interengageable elements operable for positively connecting said input and output members in unitary drive, said drive control elements and interengageable elements when engaged being subjected to thrust transmission therebetween during said relatively fast speed drive so as to resist disengagement until the thrust transmission between them is relieved and said elements being engageable under control of said driver operable control at or above a predetermined speed; means for effecting disengagement of said drive control elements to step-down said change speed mechanism from drive by said fast speed driving means to drive by said low speed driving means; and means operable in response to operation of said driver control to predetermined open throttle position during drive in said fast speed drive for effecting operation of said disengaging means and for momentarily interrupting the power delivery of said engine to sufficiently relieve the thrust transmission on said drive control elements but not on said interengageable elements thereby to step-down drive through said change speed means while maintaining said positive connection between said input and output members.

13. In a motor vehicle driving system having an engine and a driver operable engine throttle control, in combination therewith; a fluid power transmitting device having an input member drivingly connected to said engine and having an output member; a change speed mechanism having a relatively slow speed driving means and a relatively fast speed driving means, said latter means including positively engageable drive control elements operably associated therewith and adapted when engaged to establish drive of said mechanism by said fast speed driving means; a centrifugally operable clutch having interengageable elements operable for positively connecting said input and output members in unitary drive, said drive control elements and interchangeable elements when engaged being subjected to thrust transmission therebetween during said relatively fast speed drive so as to resist disengagement until the thrust transmission between them is relieved; means including said driver operable control for controlling engagement of said control elements and interengageable elements operable to effect engagement of said interengageable elements first and said control elements secondly in response to a single operation of said driver control at or above a predetermined vehicle speed; means for effecting disengagement of said drive control elements to step-down said change speed mechanism to drive by said low speed driving means; and means operable during engagement of both said drive control and interengageable elements and in response of said driver control to predetermined open throttle position for effecting operation of said disengaging means and for momentarily interrupting the power delivery of said engine to sufficiently relieve the thrust transmission on said drive control elements but not on said interengageable elements thereby to step-down drive through said change speed means while maintaining said positive connection between said input and output members.

14. In a motor vehicle driving system having an engine, an ignition system, and a driver operable engine throttle control, in combination therewith; a fluid power transmitting device having an input member drivingly connected to said engine and having an output member; a change speed mechanism having a relatively slow speed driving means and a relatively fast speed driving means, said latter means including positively engageable drive control elements operably associated therewith and adapted when engaged to establish drive of said mechanism by said fast speed driving means; a centrifugally operable clutch having interengageable elements operable for positively connecting said input and output members in unitary drive, said drive control elements and interengageable elements when engaged being subjected to thrust transmission therebetween during said relatively fast speed drive so as to resist disengagement until the thrust transmission between them is relieved; means including said driver operable control for controlling engagement of said control elements and interengageable elements operable to effect engagement of said interengageable elements first and said control elements secondly in response to a single operation of said driver control at or above a predetermined vehicle speed; means for effecting disengagement of said drive control elements to step-down said change speed mechanism to drive by said low speed driving means; and means operable during engagement of both said drive control and interengageable elements and in response of said driver control to predetermined open throttle position for effecting operation of said disengaging means and for momentarily interrupting the ignition system to sufficiently relieve the thrust transmission on said drive control elements but not on said interengageable elements thereby to step-down drive through said change speed means while maintaining said positive connection between said input and output members.

15. In a motor vehicle driving system having an engine provided with a throttle valve, in combination therewith; a slip coupling having an input member and an output member; a change speed mechanism having a low speed ratio drive means and a high speed ratio drive means; a driver operable control member for manipulating said throttle valve; and locking means in each of said coupling and high speed ratio drive means engageable at or above a predetermined vehicle speed in response to operation of said control member in a throttle valve closing direction for effecting connection of said input and output members in positive drive free from slip and for effecting establishment of said change speed mechanism in high speed ratio drive, in the order named.

16. In a vehicle transmission the combination comprising a fluid coupling having input and output elements, a low speed ratio driving means and a high speed ratio driving means arranged such that the high speed ratio driving means is automatically established in response to coast of the vehicle after acceleration to a predetermined speed in low speed ratio, and clutch means including an automatically operable device in said coupling, operable within the aforesaid speed and in response to the establishment of the aforesaid coast condition of the vehicle for locking the fluid coupling elements together for joint rotation.

17. In a vehicle transmission the combination comprising a fluid drive mechanism including a driving element and a driven element, a low speed ratio drive means and a high speed ratio drive means, clutch means in each said mechanism and high speed drive means automatically engageable in response to coast of the vehicle in low speed ratio drive above a common predetermined vehicle speed for substantially simultaneously establishing high speed ratio drive and locking the driving and driven elements of said fluid drive mechanism together and means facilitating engagement of the clutch means of said fluid mechanism prior to that of said high speed drive means.

18. In a vehicle transmission, the combination comprising a fluid drive mechanism including a driving element and a driven element, a low speed ratio drive means and a high speed ratio drive means, means operable automatically in response to coast of the vehicle after the vehicle has been accelerated to a predetermined speed in low speed ratio drive for establishing high speed ratio drive, clutch means operable within the aforesaid speed and in response to establishment of the said coast condition for locking said driving element and driven element of said fluid drive mechanism together and means operable to establish coast of the vehicle above the speed of establishment of said high speed drive for facilitating locking together of said fluid drive elements prior to establishment of said high speed drive.

19. In a motor vehicle driving system having an engine and a driver operable engine throttle control, in combination therewith; a fluid power transmitting device having an input member drivingly connected to said engine and having an output member; a change speed mechanism drivingly connected to said output member and having a relatively slow speed driving means and a relatively fast speed driving means, said latter means including positively engageable drive control elements operably associated therewith and engageable at or above a predetermined vehicle speed during vehicle coast operation to establish drive of the mechansm by said high speed driving means; a centrifugally operable clutch having interengageable elements engageable at or above a lower predetermined vehicle speed than said positive drive control elements during vehicle coast operation for positively connecting said input and output members in a unitary drive, and means for establishing said coast condition of the vehicle when the latter is at or above the engageable speed of drive control elements.

20. In a motor vehicle driving system having an engine provided with a throttle valve, and a fluid power transmitting device including input and output vaned members, in combination therewith; a change speed mechanism having a relatively slow speed ratio drive means and a relatively fast speed ratio drive means; a driver operable control member for manipulating said throttle valve; means for establishing said change speed mechanism in fast speed ratio drive and clutch means for establishing a substantially 1 to 1 ratio between said input and output members, said fast speed establishing means and said clutch means being operable to establish said fast drive and 1 to 1 ratio respectively in response to a single operation of said control member when the vehicle is above a predetermined speed.

EDWIN R. MAURER.
JOSEPH D. CATON.

References Cited in the file of this patent

UNITED STATES PATENTS

| Number | Name | Date |
|---|---|---|
| 2,170,649 | Banker | Aug. 22, 1939 |
| 2,277,799 | Syrovy et al. | Mar. 31, 1942 |
| 2,332,593 | Banker | Oct. 26, 1943 |
| 2,353,137 | Banker | July 11, 1944 |
| 2,380,677 | Schjolin | July 31, 1945 |
| 2,386,285 | Zeidler | Oct. 9, 1945 |
| 2,421,190 | Dodge | May 27, 1947 |
| 2,449,608 | Lemay | Sept. 21, 1948 |
| 2,466,721 | Maurer et al. | Apr. 12, 1949 |